Jan. 10, 1939.　　　　J. PERRY　　　2,143,027
NONSPILL LIQUID COCKTAIL DRINKING GLASS
Filed Aug. 20, 1935
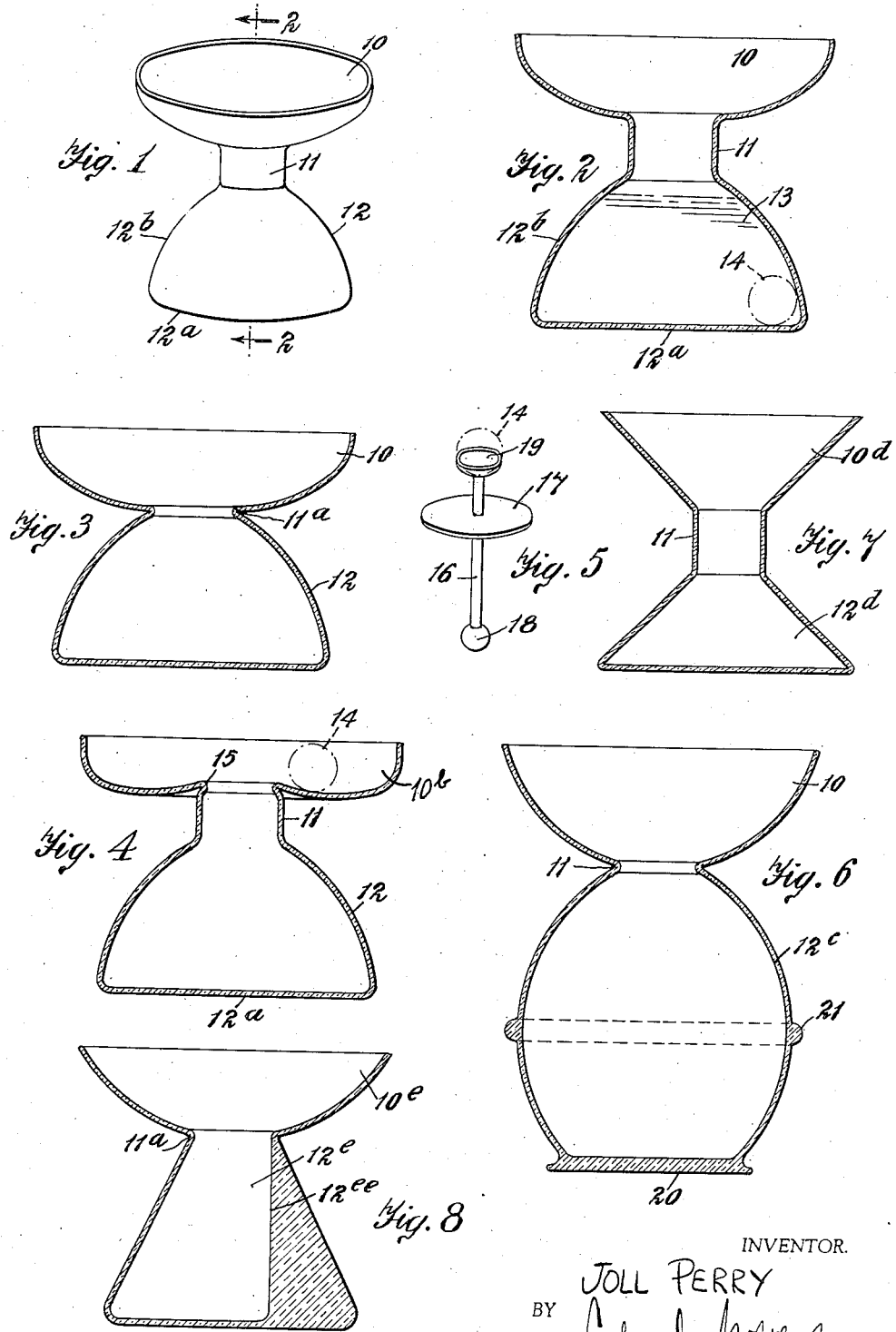
INVENTOR.
JOLL PERRY
BY
ATTORNEY.

Patented Jan. 10, 1939

2,143,027

UNITED STATES PATENT OFFICE 2,143,027

NONSPILL LIQUID COCKTAIL DRINKING GLASS

Joll Perry, New York, N. Y.

Application August 20, 1935, Serial No. 36,969

2 Claims. (Cl. 65—13)

This invention relates to new and useful improvements in liquid cocktail drinking glasses, and has particular reference to a non-spill glass.

Cocktail glasses customarily have top dish portions mounted on footed stems. The main defect of this type of glass is that because of the long stem it is quite unstable and very easily tipped over. A further defect of this type of glass is the large, shallow shape of the dish portion which permits liquid to splash from the glass with consequent damage to furniture and clothing. Spilled liquid adheres to the side of the stem where the fingers engage and makes them sticky.

This invention has for an object the construction of a liquid cocktail drinking glass which is characterized by a top dish portion connected with a central throat portion, in turn connected with a bottom container portion. It is proposed to so construct the bottom container portion that normally the liquid is within this portion. This makes the glass bottom heavy and so eliminates easy tipping over thereof.

It is furthermore proposed to arrange the bottom container portion with curved upwardly converging sides connecting with the throat portion so that if the liquid splashes it will strike the sides and be deflected downwards. Furthermore, the drinking glass is sanitary since the throat exposes but little of the liquid to the atmosphere.

Still further, the invention contemplates the shaping of certain parts of the glass so that cherries, olives, and the like may be supported thereon, which is for certain types of drinks.

Another object of the invention is to construct the bottom container substantially of spherical shape, but having a flat bottom upon which it may rest, and to arrange a circumferential bead upon the spherical portion to assist in preventing tipping of the glass.

The invention further proposes the construction of an article as described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of an article constructed according to this invention.

Fig. 2 is a sectional view taken on the line 2—2 of Fig. 1.

Fig. 3 is a sectional view of a non-spill liquid cocktail drinking glass constructed according to another embodiment of this invention.

Fig. 4 is a vertical sectional view of a still further modified form of drinking glass.

Fig. 5 is a perspective view of a combination stirrer and cover for closing the throat portion of a drinking glass.

Fig. 6 is a vertical sectional view of another embodiment of the invention.

Fig. 7 is a vertical sectional view of a still further embodiment of the invention.

Fig. 8 is a vertical sectional view of a glass embodying this invention.

The non-spill liquid cocktail drinking glass, according to this invention, comprises a top dish portion 10 connected with a central throat porton 11 which is in turn connected with a bottom container portion 12. The top dish portion 10 may be shallow or deep and have straight or curved sides, depending merely upon design. The throat portion 11 preferably should be of a large enough diameter so that an olive or cherry may pass through it into the container portion. The container portion has a flat bottom 12a upon which it may rest on a table or other flat object, and curved converging sides 12b which connect with the throat portion. The cocktail or other liquid is poured through the dish portion so that it settles into the bottom container portion 12. It is indicated on the drawing by reference numeral 13. The feature of the curved converging sides 12b of the container portion is that they tend to deflect the liquid downwards so that the possibility of splashing up through the neck portion is very remote. The dot and dash lines 14 indicate a cherry or olive within the liquid 13.

A feature of the invention is, that as the liquid is in the bottom of the glass, it is bottom heavy and any tendency of easily tipping over is counter-acted. The throat portion 11 may be used as a convenient grip for the fingers by which the glass may be manipulated.

In Fig. 3 a modified form of the invention has been disclosed in which the throat portion 11a is of a very small length. More particularly, it comprises merely the junction of the dish portion 10 and the bottom container portion 12.

In Fig. 4 another embodiment of the invention has been disclosed in which the top dish portion 10b is extremely shallow. There is also a little up-turned edge 15 at the top of the throat so that a cherry or olive 14 may maintain its position in the top dish portion.

In Fig. 5 a stirrer and closure for the various glasses is illustrated. Preferably, this stirrer and closure should be made of glass. It consists of a stem 16 intermediate of which there is a disc 17 adapted to rest upon the top of the throat portion of the glass. At the bottom the stem 16 is formed with a bulged portion 18 to facilitate stirring. At the top the stem is formed with an enlarged hollowed-out portion 19 which may act as a handle. The hollowed-out top may be used as a cup for supporting an olive, cherry or the like, indicated by reference numeral 14.

In Fig. 6 another modified form of the invention has been disclosed which is very similar to the form shown in Fig. 3 except for the fact that it has a bottom receptacle 12c substantially of spherical shape but formed with a flat bottom 20 so that it may easily rest on a flat surface. A circumferential bead 21 encircles the container portion 12c spaced slightly from the bottom so as to act as a preventative to the tipping of the glass. If the glass is accidentally tipped, the tipping will be arrested when the bead 21 strikes the supporting surface.

In Fig. 7 another modified form of the invention is disclosed which is composed of a top dish portion 10d of substantially conical shape connecting with the throat portion 11, which in turn connects with the bottom container portion 12 also of substantially conical shape.

In Fig. 8 a still further modified form of the invention is disclosed in which the top dish shaped portion 10e of the receptacle connects with a throat portion 11a, which in turn connects with a substantially conical-shaped bottom container portion 12e.

In Fig. 8 an arrangement is also disclosed which eliminates the necessity of tilting the glass substantially upside-down in order to completely empty its contents. This arrangement consists in a vertical wall 12ee aligning with one side of the throat 11. This vertical wall may be formed by a solid portion transversely across the side portion of the container portion. When this glass is used the lip should be placed against the wall side, that is the right hand end of the top dish portion as viewed in Fig. 8, so that the liquid in the glass will readily flow along the wall portion 12ee without excessive tilting of the glass. This feature may be embodied in the various glasses previously described in this specification.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. A non-spill liquid cocktail drinking glass comprising a substantially frusto-spherical dish portion, and a bottom container portion connected with the bottom of said dish portion at the axial center thereof and comprising a throat section at the junction with said dish portion and of a size ⅓ to ¼ the diameter of said dish portion, a circular base portion coaxially of said dish portion and substantially equal in diameter with said dish portion and at right angles to said axis, and a frusto conical side wall portion joining said throat portion and said base portion and having its peripheral longitudinal elements at substantially 60° to the base portion.

2. A non-spill liquid cocktail drinking glass comprising a substantially frusto-spherical dish portion, and a bottom container portion connected with the bottom of said dish portion at the axial center thereof and comprising a throat section at the junction with said dish portion and of a size ⅓ to ¼ the diameter of said dish portion, a circular base portion coaxially of said dish portion and substantially equal in diameter with said dish portion and at right angles to said axis, and a frusto-conical side wall portion joining said throat portion and said base portion and having its peripheral longitudinal elements at substantially 60° to the base portion, the interior of said frusto-conical side wall portion being of asymmetrical formation having a flat wall portion at right angles to said base portion and connecting with the edge of said throat section to reduce the necessary tilting of the glass for drinking purposes.

JOLL PERRY.